US009430949B1

(12) United States Patent
Nelson et al.

(10) Patent No.: US 9,430,949 B1
(45) Date of Patent: Aug. 30, 2016

(54) VERBAL TAXI CLEARANCE SYSTEM

(71) Applicant: HONEYWELL INTERNATIONAL INC., Morristown, NJ (US)

(72) Inventors: Erik T. Nelson, Eden Prairie, MN (US); Chaya Garg, Plymouth, MN (US); Jeff Lancaster, Cumming, IA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/668,533

(22) Filed: Mar. 25, 2015

(51) Int. Cl.
*G08G 5/02* (2006.01)
*G08G 5/06* (2006.01)
*G10L 21/0208* (2013.01)
*G06F 3/16* (2006.01)

(52) U.S. Cl.
CPC .............. *G08G 5/065* (2013.01); *G06F 3/167* (2013.01); *G10L 21/0208* (2013.01)

(58) Field of Classification Search
CPC .......... G01C 21/00; G08G 5/00; G08G 5/17; G08G 5/0021; G08G 5/003; G08G 5/034; G08G 5/039; G08G 5/095; G08G 5/065; G08G 5/06; G08G 5/0004; G08G 5/0013; G08G 5/0043; G08G 5/0065; G01L 15/26; G01L 21/0208; Y10S 715/971; G06F 3/167
See application file for complete search history.

(56) References Cited

U.S. PATENT DOCUMENTS

| | | | | |
|---|---|---|---|---|
| 7,809,405 | B1* | 10/2010 | Rand | G08G 5/0013 455/431 |
| 7,912,592 | B2 | 3/2011 | Komer et al. | |
| 2004/0181327 | A1* | 9/2004 | Tsosie | B60R 25/25 701/36 |
| 2007/0241936 | A1* | 10/2007 | Arthur | G01C 23/00 340/958 |
| 2008/0065275 | A1 | 3/2008 | Vizzini | |
| 2009/0157303 | A1* | 6/2009 | Clark | G08G 5/0039 701/408 |
| 2010/0235167 | A1* | 9/2010 | Bourdon | G10L 15/063 704/231 |
| 2011/0074607 | A1* | 3/2011 | Khatwa | G08G 5/0008 340/947 |
| 2012/0259633 | A1* | 10/2012 | Aihara | G10L 13/00 704/235 |
| 2012/0306649 | A1* | 12/2012 | Rodger | G08B 21/06 340/540 |
| 2013/0346081 | A1 | 12/2013 | Loubiere et al. | |
| 2014/0303815 | A1 | 10/2014 | Lafon et al. | |

FOREIGN PATENT DOCUMENTS

EP    2506237 A1   10/2012
WO    2014115139 A1   7/2014

OTHER PUBLICATIONS

Extended EP Search Report for Application No. 16159535.0-1810 dated Mar. 5, 2016.

* cited by examiner

*Primary Examiner* — Jerrah Edwards
*Assistant Examiner* — Adam Mott
(74) *Attorney, Agent, or Firm* — Ingrassia, Fisher & Lorenz, P.C.

(57) ABSTRACT

A verbal taxi clearance system for an aircraft and a method of controlling the same are provided. The system, for example, may include, but is not limited to a communication system, and a processor communicatively coupled to the communication system, the processor configured to receive, from the communication system, first audio data from air traffic control, convert the first audio data from air traffic control into first taxi route data, receive second audio data from a cockpit of the aircraft, convert the second audio data into second taxi route data, compare the first taxi route data to the second taxi route data, output, when the first taxi route data matches the second taxi route data, a taxi route corresponding to the first and second taxi route data, and generate an alert when the first taxi route data does not match the second taxi route data.

15 Claims, 2 Drawing Sheets

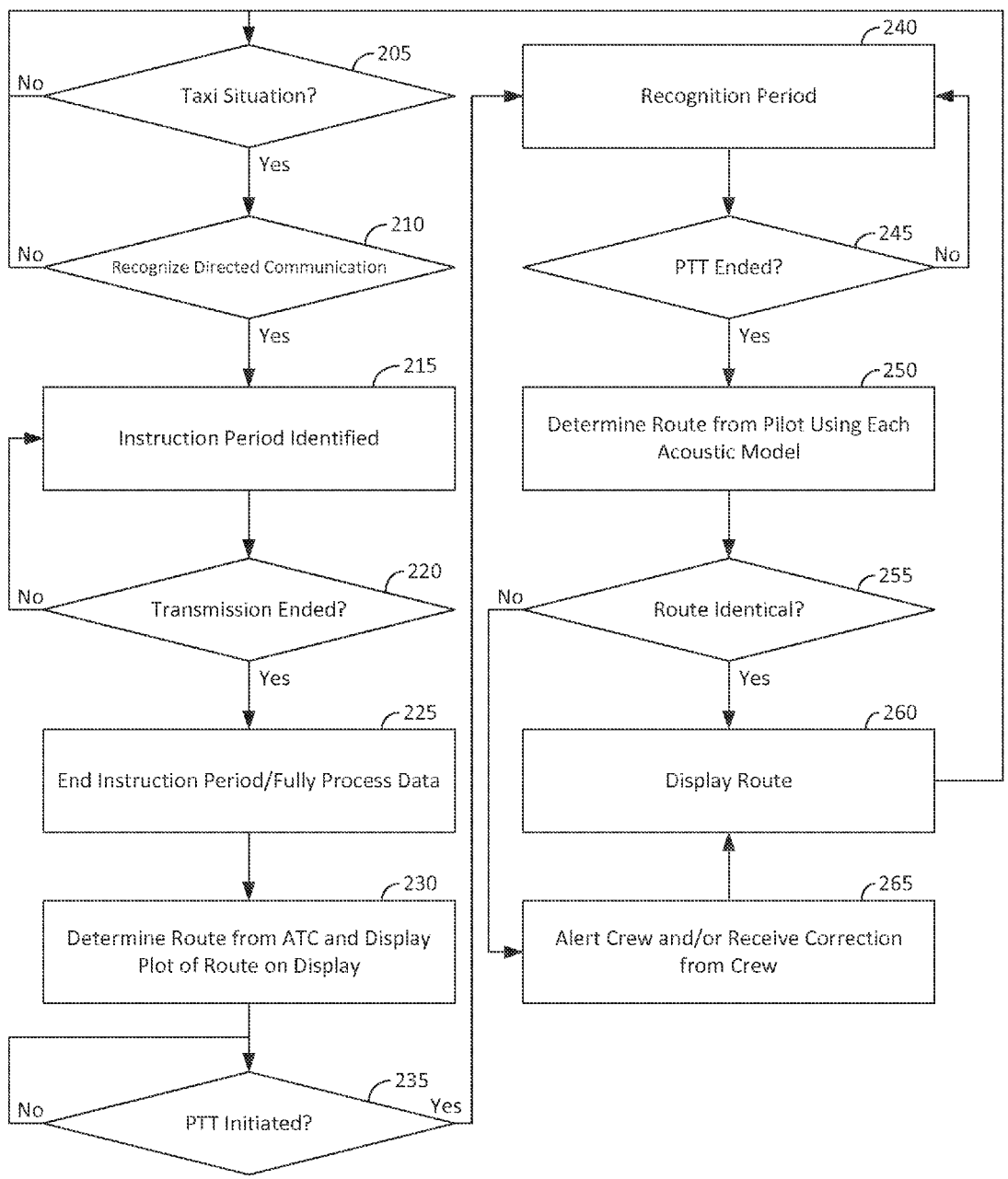

VERBAL TAXI CLEARANCE SYSTEM

TECHNICAL FIELD

The present disclosure generally relates to aircraft, and more particularly relates to aircraft communication and display systems.

BACKGROUND

Before an aircraft can taxi around an airport, the crew is required to receive taxi clearance from air traffic control. Air traffic control coordinates taxi instructions to the aircraft at the airport to organize the aircraft traffic patterns while the aircraft are on the ground. Typically, the taxi instructions are verbally relayed to an aircraft over a radio communication channel. The crew, generally the pilot or co-pilot, then has to write down the instructions so they can follow the appropriate route at the airport.

BRIEF SUMMARY

In one embodiment, for example, a verbal taxi clearance system for an aircraft is provided. The verbal taxi clearance system, may include, but is not limited to a communication system, and a processor communicatively coupled to the communication system, the processor configured to receive, from the communication system, first audio data from air traffic control, convert the first audio data from air traffic control into first taxi route data, receive second audio data from a cockpit of the aircraft, convert the second audio data into second taxi route data, compare the first taxi route data to the second taxi route data, output, when the first taxi route data matches the second taxi route data, a taxi route corresponding to the first and second taxi route data, and generate an alert when the first taxi route data does not match the second taxi route data.

In another embodiment, a method for operating a verbal taxi clearance system for an aircraft is provided. The method may include, but is not limited to, receiving, by a processor, receive, from the communication system, first audio data from air traffic control, converting, by the processor, the first audio data from air traffic control into first taxi route data, receiving, by the processor, second audio data from a cockpit of the aircraft, converting, by the processor, the second audio data into second taxi route data, comparing, by the processor, the first taxi route data to the second taxi route data, outputting, by the processor, when the first taxi route data matches the second taxi route data, a taxi route corresponding to the first and second taxi route data, and generating, by the processor, an alert when the first taxi route data does not match the second taxi route data.

In yet another embodiment, a mobile device is provided. The mobile device may include, but is not limited to a communication system, and a processor communicatively coupled to the communication system, the processor configured to receive, from the communication system, first audio data from air traffic control, convert the first audio data from air traffic control into first taxi route data, receive second audio data from a cockpit of an aircraft, convert the second audio data into second taxi route data, compare the first taxi route data to the second taxi route data, output, when the first taxi route data matches the second taxi route data, a taxi route corresponding to the first and second taxi route data, and generate an alert when the first taxi route data does not match the second taxi route data.

BRIEF DESCRIPTION OF THE DRAWINGS

The detailed description will hereinafter be described in conjunction with the following drawing figures, wherein like numerals denote like elements, and wherein:

FIG. 2 is a flow diagram illustrating a method 200 for operating the verbal taxi clearance verification system 100, in accordance with an embodiment.

DETAILED DESCRIPTION

Figure 1:
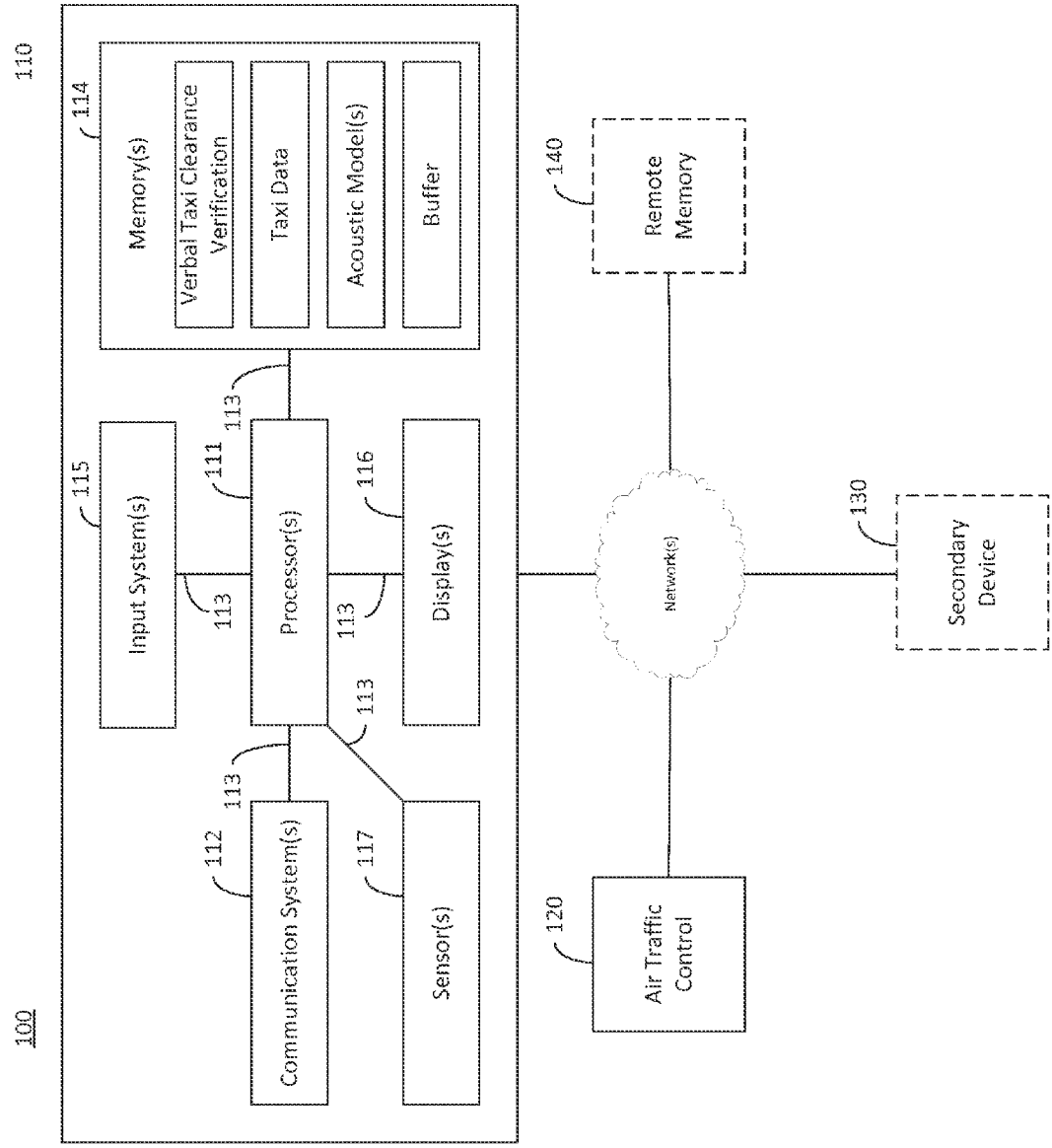
FIG. 1 is a block diagram of a verbal taxi clearance system 100, in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a verbal taxi clearance verification system is provided. The verbal taxi clearance verification analyzes radio communications between air traffic control and an aircraft and generates a taxi route for the aircraft based thereon. The taxi route could be displayed on a map, giving the crew a visual view of the required taxi route with little to no user input required.

FIG. 1 is a block diagram of a verbal taxi clearance verification system 100, in accordance with an embodiment. The verbal taxi clearance verification system 100 includes a hardware system 110. In one embodiment, for example, the hardware system 110 may be an aircraft or part of an aircraft, such as a cockpit system. However, in other embodiments, for example, verbal taxi clearance verification system 100 may be a tablet, cell phone, laptop or other portable device transportable into, or housed within, the cockpit of an aircraft.

The hardware system 110 includes at least one processor 111. The processor(s) 111 may be, for example, one or more central processing units (CPUs), graphical processing units (GPUs), physic processing units (PPUs), microcontrollers, application specific integrated controllers (ASICs), field programmable gate arrays (FPGAs), or any other logic controller or combination thereof. As discussed in further detail below, the processor(s) 111 execute non-transitory computer readable instructions for implementing the verbal taxi clearance verification system 100.

The hardware system 110 includes at least one communication system 112 coupled to at least one of the processors 111 via one or more buses 113. The communication system(s) 112 may be, for example, a very-high frequency (VHF) broadcast radio communication system, a ultra-high frequency (UHF) broadcast radio communication system, a WiFi communication system, a cellular communication system, a Bluetooth communication system, a ZigBee communication system, a satellite connection, or the like, or combination thereof. The buses 113 can vary depending upon the type of communication system 112 included in the hardware system 110. As discussed in further detail below, the communication system 112 may be used to communicate with an air traffic controller 120.

Other components of the hardware system 110 are also illustrated as being connected by buses 113. The buses could be used by one component of the hardware system 110 or may be shared with one or more other components of the hardware system 110. The buses utilized by the components of the hardware system can vary depending upon the desired communication protocol between the components of the hardware system 110.

The hardware system 110 may further include a memory 114. The memory 114 may be any combination of volatile and non-volatile memory. The memory 114 may store non-transitory computer readable instructions for implementing a method of operating the verbal taxi clearance verification system 100, as discussed in further detail below. The memory 114 may store taxi data utilized by the processor 111 to implement the verbal taxi clearance verification system 100. The taxi data may include, for example, airport map data, aircraft identification data, aircraft scheduling data, closed taxi routes, known obstructions, route data, route guidance data, or the like. The airport map data, for example, may include names and locations of runways and taxiways of one or more airports. The aircraft identification data may include, for example, data identifying an aircraft, such as a tail number or an ownship call sign. The aircraft scheduling data, for example, may indicate a scheduled departure of the aircraft. The processor 111 may update, or receive updates to, the taxi data stored in the memory 114 utilizing the communication system(s) 113. For example, the processor 111 may periodically, or upon command, connect to a remote server to download schedules, airport maps, or the like. In another embodiment, for example, periodic updates may be transmitted to the aircraft via a communication channel. However, the taxi data could be updated using any combination of the update methods.

The memory 114 may further store one or more acoustic models. In one embodiment, for example, the memory 114 may store a radio acoustic model and a cockpit acoustic model. The radio acoustic model, for example, may include a statistical model for radio-radio communication broadcast between a crew member and air traffic control 120, which aids a speech recognition program in converting the audio data into text data. The statistical model includes a statistical representation of static, atmospheric noise, air traffic control accent, a typical speed of talk of air traffic control, or the like, or any combination thereof. Likewise, the cockpit acoustic model may include statistical models based upon typical background noise experienced in the cockpit, such as engine noise, wind noise, pilot microphone properties, method of sound digitization, pilot accent, compression of filtering (if any), reverberation, or the like, or any combination thereof.

As discussed in further detail below, the processor 111 utilizes the acoustic models when performing speech recognition on cockpit-to-air traffic control communications and air traffic control-to-cockpit communications to verify taxi clearance and to generate route maps that the crew can view and follow.

The memory 114 may further include a buffer. The processor 111 may utilize a buffer in the memory 114 to temporarily store cockpit-to-air traffic control communications and air traffic control-to-cockpit communications for subsequent processing, as discussed in further detail below. In one embodiment, for example, the buffer may be arranged as a first-in-first-out (FIFO) buffer. However, the buffer may be arranged in a variety of ways.

The hardware system 110 may further include one or more input systems 115. The input system(s) 115 can include, but are not limited to, a microphone (e.g., a push-to-talk microphone or the like), a touchscreen, a mouse, a track pad, a scroll wheel, buttons, switches, or the like, or any combination thereof. The input system(s) 115 could also include interfaces, such as universal serial bus (USB) or phone jack (e.g., TS, TRS or TRRS connectors) type interfaces for coupling separate microphones or other input devices to the hardware system 110.

The hardware system 110 may further include one or more display 116. The display(s) may be dedicated to the verbal taxi clearance verification system 100 or may be shared by one or more other systems aboard an aircraft. Any type of display 116 could be used, including, but not limited to, head-up displays (HUDs) or other wearable devices, light-emitting diode (LED) displays, organic light emitting diode (OLED) displays, cathode ray tube (CRT) displays, plasma displays, liquid crystal displays (LCDs), or the like, or any combination thereof.

In one embodiment, for example, the hardware system may include one or more sensors 117. The sensors may include, but are not limited to, a global position system, an altimeter, a clock (e.g., for determining when the system is close to scheduled departure/landing), aircraft state sensors (e.g., wheel position, wheel speed sensors or the like), or the like, or any combination thereof. As discussed in further detail below, the processor 111 may utilize data from the sensor(s) 117 to determine when the aircraft is, or may soon be, in a taxi situation.

As discussed above, the hardware system 110 could be part of a cockpit of an aircraft or, for example, a standalone device such as a tablet. However, in another embodiment, a secondary device 130 may be part of the verbal taxi clearance verification system 100. The secondary device 130 could also be an aircraft, a component of an aircraft, such as a cockpit system, a tablet, a cell phone, a laptop, a radio, a server or other device transportable into or housed within the cockpit of an aircraft. In one embodiment, for example, the hardware system 110 may be a cockpit system of an aircraft and the secondary device 130 may be a mobile device, such as a tablet. However, in other embodiments, for example, the hardware system 110 may be a mobile device, such as a tablet or a laptop, and the secondary device 130 may be one or more cockpit systems of an aircraft. Any combination of the hardware system 110 and secondary devices 130 could be used.

While not illustrated, the secondary device 130 may have a processor 111, a communication system 112 a memory 114 and input system 115 and a display 116, or any subset thereof. Likewise, the hardware system 110 may have all or a subset of the processor 111, a communication system 112, a memory 114, an input system 115, and a display 116. The hardware system 110 and the secondary device 130 may communicate via their respective communication systems 112. Any of the tasks performed during the operation of the verbal taxi clearance verification system 100 could be performed by the hardware system 110 alone, the secondary device 130 alone, or any combination of the hardware system 110 and the secondary device 130. For example, if the hardware system 110 was an aircraft cockpit system and the secondary device is a tablet, the cockpit system could receive and process communications between the cockpit and air traffic control and a display of the tablet could be used to display a taxi map. However, the roles of the cockpit system and the tablet could be reversed, or, as discussed above, they could share processing or communication responsibilities.

In one embodiment, for example, the memory 114 may be embedded within the hardware system 110 and/or the secondary device 130; however, the hardware system 110 and/or the secondary device 130 may also communicate with a remote memory 140 via their respective communication systems 112. The taxi data, acoustic and/or grammar models, buffers, the instructions for implementing the verbal taxi clearance verification system, or any subset or portion thereof, could be stored in the remote memory 140. The remote memory 140 may be, for example, a network accessible memory, a flash drive, a CD/DVD/Blu-ray disk, or the like, or any combination thereof.

FIG. 2 is a flow diagram illustrating a method 200 for operating the verbal taxi clearance verification system 100, in accordance with an embodiment. A processor 111 may first determine if the aircraft is in a taxi clearance situation (Step 205). A taxi clearance situation occurs when the aircraft is on ground or on approach to an airport. In one embodiment, for example, the processor 111 may determine that the aircraft is in a taxi clearance situation based upon the taxi data stored in the memory 114. As discussed above, the taxi data may include schedule information. Accordingly, if the aircraft is within a predetermined period of time before a scheduled departure or arrival, the processor 111 may determine that the aircraft is in a taxi clearance situation. The processor 111 could also determine that the aircraft is in a taxi clearance situation based upon data from one or more of the sensors 117. If the data from the sensors indicate that the aircraft is on the ground and stopped, on the ground and moving, and/or in the air and approaching an airport, then the processor may determine that the aircraft is in a taxi clearance situation. If the aircraft is not in a taxi clearance situation, the processor 111 continues to monitor for taxi clearance situations.

In one embodiment, for example, the processor 111 may begin storing audio communication data received from air traffic control via a communication system 112 upon determining that the aircraft is in a taxi clearance situation (i.e., Step 205). However, in other embodiments, the processor 111 may always store audio communication data received from air traffic control in the buffer. The buffer in the memory 114 may have a fixed size where the oldest audio communication data is rewritten when the buffer is full, but that is large enough to ensure that the desired information would not be deleted before the processor 111 can analyze the data.

When the processor 111 determines that the aircraft is in a taxi situation, the processor 111 begins to save radio communication data in the buffer, if the buffer was not already saving the radio communication data, and begins to process the radio communication data received from air traffic control to determine if a communication is directed to the specific aircraft. (Step 210). As discussed above, the identification of the aircraft may be the tail number of the aircraft, an ownship call sign, or the like. When air traffic control uses radio communication to transmit taxi clearance information, the processor 111 utilizes speech recognition processing to convert the audio data in the buffer to text. The processor 111 may utilize the radio acoustic model when performing the speech recognition to compensate for background noise which can be experienced via an audio transmission, improving the accuracy of the speech recognition process. The processor 111 then analyzes the text output from the speech recognition process to determine if the identification of the aircraft was mentioned. If the processor 111 does not recognize the aircraft identification, the processor 111 returns to step 205 to determine if the aircraft is still in a taxi situation.

When the processor 111 determines that the aircraft identification for the target aircraft was mentioned by air traffic control, the processor determines that an instruction period is occurring, or has occurred, where an instruction may be sent from air traffic control. (Step 215). In this period, the processor 111 continues to save the radio communication received from air traffic control in a buffer of the memory 114. The processor 111 may also attempt to identify the beginning of the message being directed to the aircraft during this period. In one embodiment, for example, the processor 111 may identify the beginning of the message by looking for gaps in the audio data. In other words, the processor 111 may determine the beginning of the message by looking for a gap in the audio data preceding the data corresponding to the aircraft identification. In one embodiment, for example, the processor 111 may begin to convert the all of the audio data into text via speech recognition after determining the beginning of the corresponding message. However, in other embodiments, for example, the processor 111 may wait until the entire taxi instruction is received before converting the audio data into text data. As discussed above, the processor 111 may utilize a radio acoustic model to perform the speech recognition to improve the accuracy of the speech recognition by using the statistical representations of the radio acoustic model.

The processor 111 continues the radio acoustic model speech recognition period until the processor 111 determines that the transmission from air traffic control has ended. (Step 220). In one embodiment, for example, the processor 111 may determine that the transmission has ended if there is a predetermined period of silence from air traffic control. The predetermined period may be, for example, 1 second or 0.75 seconds. However, the time period could be set to any value. In another embodiment, for example, the processor 111 may analyze the signal that is being transmitted for audible or sub-audible "click" from the termination of the transmission. These clicks could be used as a marker for the start and finish of a transmission and could be used alone or in conjunction with the timing method already mentioned. In another embodiment, for example, the processor 111 may analyze a pattern of audio distortion in the radio transmission signal. Air traffic control, for example, will have a different distortion signature than other pilots as they often have a higher powered transmitter. However, any combination of methods to identify the beginning and end of the radio transmissions may be used.

When the processor 111 determines that the transmission from air traffic control has ended, the processor 111 completes processing any remaining audio data received during the recognition period using the radio acoustic model. (Step 225) In one embodiment, for example, the processor 111 may optionally analyze the text from the speech recognition processes and determine the taxi route transmitted by air traffic control. (Step 230). However, in another embodiment, for example, the processor 111 may wait to analyze the data until after the pilot transmits a confirmation, as discussed in further detail below. The route is typically transmitted using phonetic alphabet characters and numbers corresponding to taxiway and runway identifications. For example, the instruction, "Alpha Six, Kilo Two, Bravo Niner," is an instruction to travel from taxiway A6 to taxiway K2 to taxiway B9. The taxi instructions could include hold short instructions, requesting the aircraft to wait at the hold short line of one of the intersecting taxiways or runways before proceeding. The route may be determined, for example, by determining where the instructions intersect on a map of the airport. In one embodiment, for example, the processor 111 may then display a plot of the route on the display 116. However, in other embodiments, the processor 111 may wait to display the taxi route until a crew member has confirmed the taxi route, as discussed in further detail below.

In response to receiving the taxi instructions, a member of the crew transmits a radio communication to air traffic control confirming the instructions (this is commonly referred to as "readback"). In one embodiment, for example, the crew member may utilize a push-to-talk radio system to perform the confirmation. The processor 111, after determining that the transmission from air traffic control has ended in Step 220, monitors to determine when the push-to-talk button has been interacted with, such as a button depressed, in the push-to-talk radio system. (Step 235).

When the push-to-talk button of the push-to-talk radio system has been depressed, the processor begins at least one of a radio acoustic model speech recognition period and a cockpit acoustic model recognition period. (Step 240). In one embodiment, for example, in the radio acoustic model speech recognition period, the processor 111 saves the audio data transmitted by the communication system 112 over a radio transmission protocol. In other words, the processor 111 saves the communication from the pilot as the communication is being broadcast to air traffic control over the radio for later processing. In the cockpit acoustic model recognition period, the processor 111 saves the audio data received at the input system 115. In other words, the processor 111 may save the communication from the pilot as the pilot is speaking in the cabin of the aircraft for later processing. The input system 115 used to capture the audio data in the cockpit may be the same input system 115 used to capture the data for radio transmission. However, the processing, discussed in further detail below, could also be performed in real time without the data being saved. In yet another embodiment, for example, a second microphone system may be used to capture the audio in the cockpit which is either always on or triggered to begin receiving the audio data when the processor 111 detects that the push-to-talk button of the push-to-talk radio system has been depressed.

As discussed above, the processor 111 may begin performing speech recognition processing on the audio data as the audio data is being received during the radio acoustic model speech recognition period and/or cockpit acoustic model recognition period. When the processor 111 is collecting audio data transmitted over a radio communication channel, the processor may utilize the radio acoustic model to improve the accuracy of the speech recognition, as discussed above. When the processor 111 is collecting audio data directly from the cockpit, the processor 111 may use a cockpit acoustic model while performing speech recognition to improve the accuracy of the speech recognition, as discussed above.

The processor 111 continues to save the audio data until the processor detects that the push-to-talk button of the push-to-talk radio system has been released. (Step 245). After the processor 111 determines that the push-to-talk button of the push-to-talk radio system has been released, the processor 111 performs the speech recognition utilizing the respective acoustic models, or finalizes the speech recognition if the processor 111 began the operation before the end of the audio transmission, to extract and analyze taxi instructions from the audio data. (Step 250). As discussed above, the processor 111 converts the audio data into text. At least a portion of the text should correspond to taxi instructions. The taxi instructions, as discussed above, are generally in the form of a list of pathways the aircraft should follow during the taxi procedure. The processor 111 can then determine the taxi route according to the taxi instructions. As discussed above, the processor 111 may determine the taxi route by determining where the taxiways in the taxi instructions intersect. When both the pilot audio data from the radio transmission and the pilot audio data received directly from the cockpit are analyzed, the processor 111 determines two taxi routes, one from each data set.

The processor 111 then compares the taxi route received over the radio communication channel from air traffic control with the taxi route(s) captured when the crew member reads back the taxi route. (Step 255). When the processor 111 captures audio data broadcast over a broadcast communication system as well as audio data from the cockpit of the aircraft, the processor 111 may compare both of the routes determined therefrom with the taxi route from the air traffic control audio data.

When all of the determined taxi routes are identical, the processor 111 can display the taxi route on the display 116. (Step 260). When all of the taxi routes are determined to be identical, the processor 111 can presume that the identically identified taxi route has been accurately captured by the system. As discussed above, the display 116 can be a display on the aircraft or a display on a portable device, such as a tablet or cellular phone. Accordingly, as current standard communication procedures between air traffic control and an aircraft require that a crew member verbally verify the taxi instructions received, the verbal taxi clearance system 100 captures, double checks, and displays the taxi route without any additional input required from the crew. As such, the verbal taxi clearance system 100 reduces the burden on the crew by automatically providing a display of the taxi route the aircraft is directed to take without any additional input from either air traffic control or the crew aboard the aircraft. In one embodiment, for example, if only one of the two taxi routes determined in step 255 matches the taxi route determined in step 230, the processor 111 could assume that the taxi route was correctly determined by the processor 111. However, the verbal taxi clearance system 100 could also require both of the taxi routes determined in step 255 to match the taxi route determined in step 230 in order to assume that the taxi route was correctly determined by the processor 111. The tolerance of matches could be set in either fashion as desired by a pilot, airline, air traffic control, engineer of the system, or other governing body.

When the number of incorrect matches between the taxi route(s) determined in step 255 and the taxi route determined in step 230 exceed the tolerance threshold, the processor 111 generates an alert. (Step 265). In other embodiments, for example, a visual and/or audible alert could be initiated by the processor 111 to alert the crew that the processor 111 detected a possible difference between the taxi instructions received from air traffic control and the confirmation instructions sent by the crew. In another embodiment, for example, the alert may include a visual display of the differences between the taxi routes on the display 116. As discussed above, the hardware system 110 may further include one or more input systems 115, including, in some embodiments, a touch screen, a mouse or other cursor control device, or the like. In these embodiments, the processor 111 may monitor the input system(s) 115 for input corresponding to changes in the taxi route displayed on the display or for the acceptance of one of the taxi routes being displayed. A member of the crew, for example, could correct or accept one of the displayed routes using one or more of the input systems 115 to correct the displayed taxi route. Accordingly, when there is a discrepancy in the taxi routes generated based upon the audio input from air traffic control and the crew, only minimal user input is needed to generate the taxi route.

The approved route is then displayed on the display 116. (Step 260). The route, either generated in Step 250, or approved/corrected in Step 265, can be used by the crew to navigate through the airport. In one embodiment, for example, the route can be overlaid over a map of the airport, giving pilots a much better idea of where they will be turning and what their overall route looks like. The airport map for one or more airports may be saved, for example, in the taxi data in the memory 114. In other embodiments, for example, the taxi route may be displayed as text (i.e., a list of routes the aircraft is instructed to take), the taxi route may be presented aurally (e.g., as audio turn by turn directions as the aircraft 100 approaches turns based upon a distance to a turn and/or a time to the next turn). Any combination of output methods may be used to present the taxi route to the crew.

The method then returns to Steps 205 and 210 thereby allowing the system to monitor for any changes to the taxi route which may be transmitted from air traffic control.

While the above description discussed using, for example, processor 111 to perform various tasks and display 116 to display routes, any combination of the components of the hardware system 110 and the secondary device 130 could be used to implement each step of the process. For example, if the hardware system 110 is a cockpit system of an aircraft, the processor 111 of the hardware system 110 may perform the speech recognition and route generation processing and a display (not illustrated) and input device(s) (not illustrated) of a secondary device, for example, a tablet, may be used to display taxi routes and to receive any changes to a displayed taxi route. However, as discussed above, the hardware system 110 could also be a tablet, or the like and the secondary device may be one or more components of a cockpit system; thus, a tablet or other portable device may be used to perform the speech recognition and components of a cockpit system can be used to display and interact with displayed taxi routes.

While the above description discussed utilizing speech recognition in the context of an aircraft, the methods discussed herein could be used in a variety of applications. For example, in the context of shipyards, the system could be used to verify and output a route for a ship to a berth, or the like. In the context of automobiles (e.g., taxi, police, firefighters, delivery companies, military vehicles or the like), the system could be used with a central dispatch to verify and output directions to a location or target of interest.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A verbal taxi clearance system for an aircraft, comprising:
    a broadcast communication system;
    an input system;
    a processor communicatively coupled to the communication system and the input system, the processor configured to:
        receive, from the broadcast communication system, first audio data broadcast by air traffic control;
        convert the first audio data broadcast by air traffic control into first taxi route data using a radio acoustic model;
        receive, from the input system, second audio data generated by a crew member in a cockpit of the aircraft;
        convert the second audio data into second taxi route data utilizing a cockpit acoustic model;
        receive, from the broadcast radio communication system, third audio data;
        convert the third audio data into third taxi route data utilizing the radio acoustic model;
        compare the first taxi route data to the second taxi route data and the third taxi route data;
        output, when the first taxi route data matches the second taxi route data and the third taxi route data, a taxi route corresponding to the first and second taxi route data; and
        generate an alert when the first taxi route data does not match the second taxi route data and the third taxi route data.

2. The verbal taxi clearance system of claim 1, wherein the cockpit acoustic model includes a statistical models of at least one of engine noise, wind noise, pilot microphone properties, method of sound digitization, pilot accent, compression of filtering, and reverberation.

3. The verbal taxi clearance system of claim 1, wherein the alert generated by the processor includes a display of differences between the first taxi route data and the second taxi route data.

4. The verbal taxi clearance system of claim 3, wherein the processor is further configured to:
    receive, from the input system, a correction to one of the first taxi route data and the second taxi route data.

5. The verbal taxi clearance system of claim 1, wherein the processor is further configured to:
    monitor the communication system for the first audio data when the aircraft is in a taxi situation.

6. The verbal taxi clearance system of claim 1, wherein the input system comprises a push-to-talk input system communicatively coupled to the processor, the push-to-talk input system comprising a push-to-talk button configured to initiate a communication,
    wherein the processor is further configured to:
        monitor, after receiving the first audio data, for a interaction with the push-to-talk button; and
        recording, when the interaction the push-to-talk button is initiated, the communication, the communication including the second audio data.

7. The verbal taxi clearance system of claim 1, wherein the radio acoustic model includes a statistical model of at least one of static, atmospheric noise, air traffic control accent, and a typical speed of talk of air traffic control.

8. A method for operating a verbal taxi clearance system for an aircraft, comprising:
    receiving, by a processor from a communication system, first audio data broadcast by air traffic control;
    converting, by the processor, the first audio data from air traffic control into first taxi route data utilizing a radio acoustic model;
    receiving, by the processor, second audio data generated by a crew member in a cockpit of the aircraft;
    converting, by the processor, the second audio data into second taxi route data;

receive, by the processor, third audio data generated by the crew member in the cockpit of the aircraft;

convert, by the processor, the third audio data into third taxi route data;

comparing, by the processor, the first taxi route data to the second taxi route data and the third taxi route data;

outputting, by the processor, when the first taxi route data matches the second taxi route data and the third taxi route data, a taxi route corresponding to the first and second taxi route data; and generating, by the processor, an alert when the first taxi route data does not match the second taxi route data and the third taxi route data.

9. The method of claim 8, further comprising:

determining, by the processor, when the aircraft is in a taxi situation;

processing, by the processor, a radio channel corresponding to air traffic control to determine when aircraft identification corresponding to the aircraft is mentioned on the radio channel;

recording, by the processor, the radio channel until a predetermined length pause occurs in the radio channel to create the first audio data.

10. The method of claim 8, further comprising:

determining, by the processor, when a push-to-talk button on a push to talk interface is activated;

recording, by the processor while the push-to-talk button on the push to talk interface is activated, aircraft cabin data to create the second audio data.

11. The method of claim 8, further comprising:

determining, by the processor, when a push-to-talk button on a push to talk interface is activated;

recording, by the processor while the push-to-talk button on the push to talk interface is activated, a radio channel to create the second audio data.

12. The method of claim 8, wherein the radio acoustic model includes a statistical model of at least one of static, atmospheric noise, air traffic control accent, and a typical speed of talk of air traffic control.

13. The method of claim 8, wherein the converting, by the processor, the second audio data into second taxi route data further comprises, converting the second audio data using a cockpit acoustic model, the cockpit acoustic model including a statistical models of at least one of engine noise, wind noise, pilot microphone properties, method of sound digitization, pilot accent, compression of filtering, and reverberation.

14. A mobile device, comprising:

a communication system;

a processor communicatively coupled to the communication system, the processor configured to:

receive, from the communication system, air traffic control audio data broadcast by air traffic control;

convert the air traffic control audio data into first taxi route data utilizing a radio acoustic model;

receive second audio data generated by a crew member in a cockpit of an aircraft;

convert the second audio data into second taxi route data utilizing a cockpit acoustic model;

receive, from the communication system, third audio data generated by a crew member in a cockpit of the aircraft;

convert the third audio data into third taxi route data utilizing the radio acoustic model;

compare the first taxi route data to the second taxi route data and the third taxi route data;

output, when the first taxi route data matches the second taxi route data and the third taxi route data, a taxi route corresponding to the first, second and third taxi route data; and generate an alert when the first taxi route data does not match the second taxi route data and the third taxi route data.

15. The mobile device of claim 14, wherein the radio acoustic model includes a statistical model of at least one of static, atmospheric noise, air traffic control accent, and a typical speed of talk of air traffic control, and the cockpit acoustic model including a statistical models of at least one of engine noise, wind noise, pilot microphone properties, method of sound digitization, pilot accent, compression of filtering, and reverberation.

* * * * *